//Patent

United States Patent Office 2,852,526
Patented Sept. 16, 1958

2,852,526
SUBSTITUTED PYRROLIDINES

Frank John Villani, Cedar Grove, and Nathan Sperber, Bloomfield, N. J., assignors to Schering Corporation, Bloomfield, N. J., a corporation of New Jersey No Drawing. Application May 3, 1955
Serial No. 505,834

15 Claims. (Cl. 260—313)

This invention relates to a new group of pyrrolidine compounds having important therapeutic properties and to processes for preparing the same. More particularly, this invention relates to 3,4-diphenylpyrrolidines which possess antihistaminic, anticholinergic and bronchodilator properties.

The compounds of our invention may be represented by the following general Formula I and include the non-toxic acid addition and quaternary salts thereof:

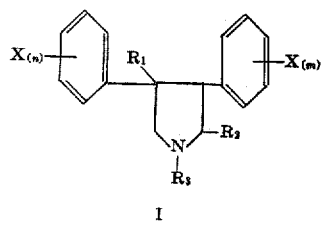

I wherein $R_1$ is a member of the group consisting of H and OH, $R_2$ represents H or lower alkyl, $R_3$ is a member of the group consisting of lower alkyl, lower alkenyl and benzyl, X is a member of the group consisting of H, halogen, hydroxyl, lower alkyl and lower alkoxy, and $n$ and $m$ are integers of the group consisting of 1 and 2.

We have found that the compounds of the general formula, depending upon the definition of the variants, exhibit one or more of the aforementioned therapeutic actions. For example, the methobromide quaternary salt of the general formula wherein $R_1$, $R_2$ and X are hydrogen and $R_3$ is isopropyl exhibits a bronchodilator activity comparable to the more potent bronchodilators in clinical use today and also possesses antihistaminic and anticholinergic properties. Although several related compounds are known such as 3,4-diphenylpyrrolidine, their activity, if at all present, is of a very low order. It appears that both phenyl groups are required in order for the compound to possess the therapeutic properties described, for wherein one of the phenyl groups (with substituents, if any) is replaced by hydrogen or alkyl, we have found the resultant compound to be relatively devoid of bronchodilator activity. We have further found that the nitrogen atom must be at least tertiary and preferably quaternary in order for the compound to have a desired level of activity.

The compounds of our invention are prepared by a series of relatively simple transformations. For the most part, the compounds of the general formula wherein $R_1$ and $R_2$ are hydrogen are preferably prepared by reduction of the corresponding 3,4-diphenylsuccinimide with a reducing agent such as lithium aluminum hydride (or catalytic hydrogenation) whereby the diphenylpyrrolidine is produced. For the most part, the requisite intermediate succinimides are known compounds, however, in some cases it has been necessary to prepare hitherto undescribed succinimides, according to the following sequence of reactions, which are then transformed into the pyrrolidine by reduction:

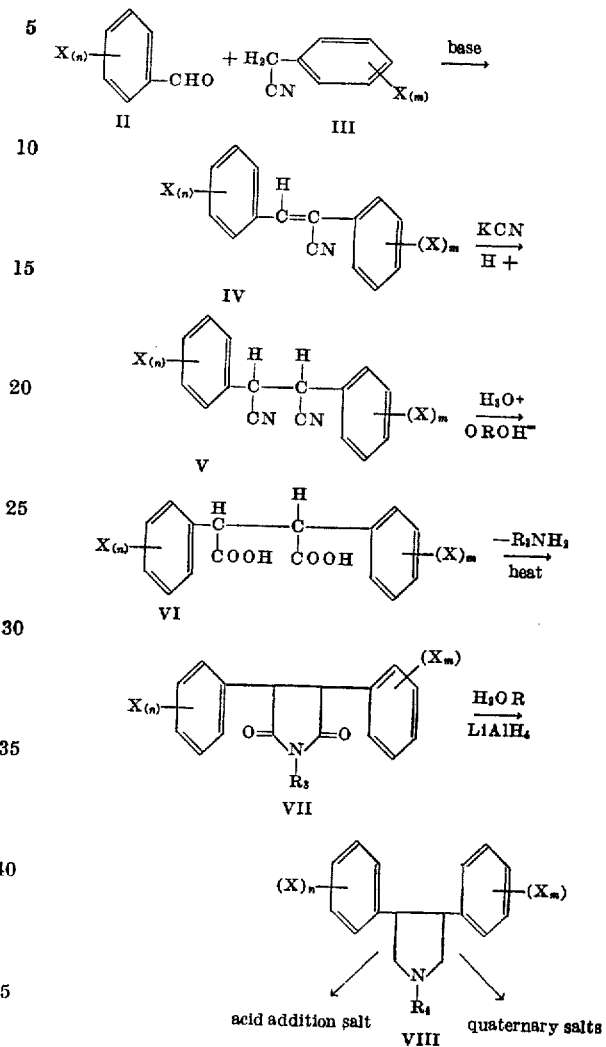

In the above sequence, an appropriately substituted benzaldehyde (II) is reacted with an appropriate phenylacetonitrile (III) in the presence of a basic catalyst such as sodium alkoxide, sodium hydroxide, sodamide and the like, giving rise to the unsaturated nitrile (IV). The addition of hydrogen cyanide across the conjugated double bond results in the formation of the substituted succinonitrile (V) which is easily hydrolyzed to the corresponding succinic acid (VI). Upon heating the dibasic acid with a primary amine, the substituted succinimide (VII) is conveniently obtained. The succinimide is transformed into the pyrrolidine (VIII) by reductive procedures heretofore mentioned and hereinafter described in more detail and the pyrrolidine may be converted into its acid addition salt or quaternary salt in the usual manner.

Although the above procedure appears to be lengthy and contain several steps, some of which theoretically could be eliminated or combined, we have found this procedure to be preferable in the preparation of hitherto unknown intermediates since we have obtained better yields and purer products than with other preparations.

An alternate procedure for the preparation of the free bases of the general formula is depicted below wherein the preparation of N-alkyl-3,4-diphenylpyrrolidine is described:

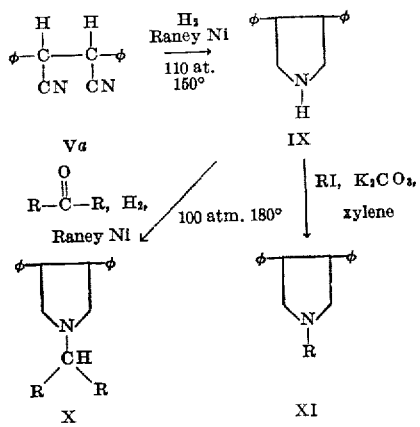

In the above scheme, a succinonitrile, specifically 2,3-diphenylsuccinonitrile, is hydrogenated in the presence of Raney Nickel at elevated pressures and temperatures wherein 3,4-diphenylpyrrolidine is produced. This particular step is not very efficient in that several side reactions occur, in addition to failure of the dinitrile to cyclize, and thus the yield is low. Subjecting the diphenylpyrrolidine (IX) to reductive alkylation procedures employing a ketone as the alkylating agent, gives rise to diphenylpyrrolidines containing a secondary alkyl group on the nitrogen (X). (We have also found that compounds similar to X may be prepared by reductive alkylation using platinum oxide catalyst at about three atmospheres hydrogen pressure.)

The secondary amino group in IX may be alkylated in the usual manner using the appropriate alkyl halide in the presence of a basic reagent and inert solvent such as an alkyl iodide with potassium carbonate in xylene for example.

A further procedure for the preparation of the compounds employs a phenylacetonitrile, 3,4-dimethoxyphenylacetonitrile, for example, which is condensed with an alpha-halo-phenylacetic ester such as ethyl-alpha-bromophenyl acetate in the presence of a basic catalyst such as sodamide giving rise to alpha(3,4-dimethoxyphenyl)-beta-phenyl-beta-carbethoxypropionitrile. In tramolecular reductive cyclization is effected using platinum oxide or Raney Nickel with hydrogen and the 3-phenyl-4-(dimethoxyphenyl)-2-pyrrolidone so obtained is reduced with lithium aluminum hydride yielding the corresponding pyrrolidine which may be alkylated as heretofore described.

We have found that the intermediate 3,4-diphenyl-2-pyrrolidones may be prepared as follows:

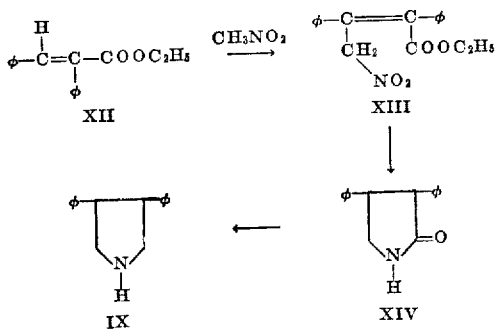

In the above scheme, an alpha-phenylcinnamic ester prepared in a known manner through the Perkin reaction, is reacted with nitromethane in the presence of a base giving rise to the nitro ester (XIII). Reductively, cyclization of XIII affords the diphenylpyrrolidone (XIV) which upon reduction with lithium aluminum hydride, for example, gives rise to the diphenylpyrrolidine (IX) which is alkylated as heretofore described. In the foregoing equation and those which follow, the symbol "$\phi$" represents "$C_6H_5$."

As indicated earlier, these latter reactions are presented merely to show other methods which may be considered equivalent chemically to the preferred preparation heretofore described.

In order to prepare compounds of the general formula containing an alkyl substituent in the pyrrolidine ring, the following sequence of reactions is applicable:

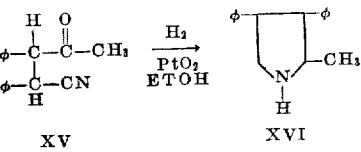

The requisite intermediate, 1,4-keto-nitrile (XV) is conveniently prepared in a known manner by the caustic condensation of a phenylacetone and a benzaldehyde followed by the addition of hydrogen cyanide across the obtained conjugated double bond. Reductive alkylation of a compound of the type shown by XV gives rise to a diphenylpyrrolidine containing an alkyl group in the 2-position, specifically, in this case, 2-methyl-3,4-diphenylpyrrolidine (XVI), which is alkylated according to methods heretofore described.

In order to prepare compounds of the general formula wherein $R_1$ is a hydroxyl group, a 3-pyrrolidone is a requisite starting material. The preparation of the intermediate pyrrolidones are shown in the general reaction described below wherein the variables have the same definition as described in the general formula and wherein an unsubstituted phenyl group is shown merely for the sake of clarity:

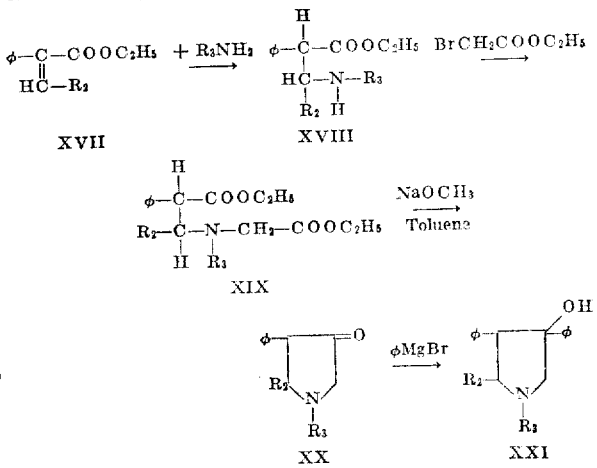

In the foregoing sequence, a substituted acrylic ester (XVII) is reacted with a primary amine in a known manner for effecting a Michael addition giving rise to the amino ester (XVIII). Alkylation of the secondary amino group with a bromoacetic ester, for example, affords the imino-diester (XIX) which, when subjected to the cyclization condition prescribed for the known Dieckmann reaction, affords the intermediate 3-pyrrolidone (XX). The Grignard reaction between XX and phenyl magnesium bromide, for example, gives rise to XXI which is an example of the compound of the general formula wherein $R_1$ is hydroxyl. The hydroxy pyrrolidine (XXI) may be converted into its acid addition or quaternary salt if desired.

The acid addition salts of the free bases of the general formula are prepared from the free base and a non-toxic acid preferably in an inert solvent whereby the salt precipitates in a relatively pure state. Examples of non-toxic salts which may be prepared are hydrochloride, maleate, citrate, tartrate, salicylate and the like.

The quaternary salts are prepared by reacting the free base with the appropriate alkyl cation in the form of an alkyl halide, sulfate and the like, generally in an inert solvent. In many cases, a quarternary salt may be transformed into a salt possessing a different anion by well described procedures such as transhalogenation of a quaternary iodide with silver bromide or silver chloride or conversion of a quaternary halide, for example, to the quaternary ammonium hydroxide by means of moist silver oxide and treating the quaternary ammonium hydroxide so obtained with an acid such as citric, tartaric acid and the like. Specific examples of quaternary salts which may be employed are methyl bromide, methyl iodide, methyl sulfate, ethyl bromide, butyl bromide, benzyl chloride, methyl citrate and the like.

The compounds of this invention are preferably administered orally in the form of tablets, capsules, elixirs, suspensions and other similar pharmaceutical dosage forms. Where parenteral administration is indicated, the compounds may be incorporated by solution in a non-toxic vehicle.

The following examples more clearly depict the methods by which the compounds of this invention may be prepared but in no way limit this invention except as defined in the appended claims.

EXAMPLE 1

1-methyl-3,4-diphenylpyrrolidine

To a stirred suspension of 18 g. of lithium aluminum hydride in 1.2 liters of refluxing anhydrous ether, there is added 30 g. of N-methyl-3,4-diphenylsuccinimide (prepared according to the procedure of Long et al., J. Am. Chem. Soc. 73, 5608 (1951) suspended in 300 ml. of anhydrous ether. The reaction mixture is stirred and refluxed for 16 hours and after cooling, the mixture is decomposed with water in the usual manner and extracted thoroughly with ether. The ether solution is dried and the solvent removed in vacuo. The residual oil is distilled yielding 22 g. of 1-methyl-3,4-diphenylpyrrolidine, B. P. 162–164/2 mm.

EXAMPLE 2

1-methyl-3,4-diphenylpyrrolidine hydrochloride

An ether solution of 1-methyl-3,4-diphenylpyrrolidine is saturated with anhydrous hydrogen chloride until the precipitation of the insoluble salt is complete. The crystalline salt is removed by filtration and purified by recrystallization from ethanol-ether, M. P. 194–196°.

Alternatively, 1-methyl-3,4-diphenylpyrrolidine is dissolved in anhydrous ethanol and an equivalent amount of anhydrous hydrogen chloride is added. The precipitated product is purified as above described.

EXAMPLE 3

1-methyl-3,4-diphenylpyrrolidine methyl bromide

A solution of 10 g. of 1-methyl-3,4-diphenylpyrrolidine in 100 ml. of anhydrous ether is saturated with anhydrous methyl bromide. The mixture is held at 0° to 5° for several hours and the precipitated quaternary salt is removed by filtration and recrystallized from ethanol ether. There is obtained 10 g. of the salt as a white crystalline substance, M. P. 190–191°.

EXAMPLE 4

1-n-propyl-3,4-diphenylpyrrolidine

By reacting 60 g. of N-n-propyl-3,4-diphenylsuccinimide with 30 g. of lithium aluminum hydride as described in Example 1, there is obtained, after distillation, 50 g. of 1-n-propyl-3,4-diphenylpyrrolidine, B. P. 160–164°/2 mm.

EXAMPLE 5

1-n-propyl-3,4-diphenylpyrrolidine hydrochloride

By saturating an ether solution of 1-propyl-3,4-diphenylpyrrolidine with anhydrous hydrogen chloride and recrystallization of the salt so obtained from alcohol-ether, there is obtained the compound of this example, M. P. 202–203°.

EXAMPLE 6

1-n-propyl-3,4-diphenylpyrrolidine methiodide

To an ether solution of 10 g. of 1-n-propyl-3,4-diphenylpyrrolidine is added an excess of methyl iodide and the mixture is allowed to stand over night. The crystalline salt is removed by filtration and purified from ethanol-ether yielding 9 g. of the quaternary salt of this example, M. P. 209–210°.

EXAMPLE 7

1-isopropyl-3,4-diphenylpyrrolidine

The compound of this example is obtained from the reaction of 30 g. of N-isopropyl-3,4-diphenylsuccinimide and 16 g. of lithium aluminum hydride according to the procedure described in Example 1. Upon distillation, there is obtained 25 g., B. P. 187–190°/5 mm.

The hydrochloride of the free base of this example is prepared by saturating an ether solution of the base with anhydrous hydrogen chloride as described in preceding examples. Upon recrystallization from ethanol-ether, 1-isopropyl-3,4-diphenylpyrrolidine hydrochloride is obtained as white crystals, M. P. 158–159°.

EXAMPLE 8

1-isopropyl-3,4-diphenylpyrrolidine methyl bromide

By saturating a 10% ether solution of 1-isopropyl-3,4-diphenylpyrrolidine with anhydrous methyl bromide according to the procedure of Example 3, the above identified quaternary salt is obtained as white crystals, M. P., 255–256°.

EXAMPLE 9

1-isopropyl-3,4-diphenylpyrrolidine methiodide

An ether solution of 1-isopropyl-3,4-diphenylpyrrolidine containing an excess of methyl iodide is treated as described in Example 6. The crystalline quaternary salt of this example is purified by recrystallization from ethanol-ether, M. P. 215–216°.

EXAMPLE 10

1-allyl-3,4-diphenylpyrrolidine

According to the procedure of Example 1, the reaction of 29 g. of N-allyl-3,4-diphenylsuccinimide with 14.4 g. of lithium aluminum hydride affords 26 g. of 1-allyl-3,4-diphenylpyrrolidine, B. P. 167–171°/1 mm.

The hydrochloride salt is prepared according to procedures previously described, M. P. 160–161°.

EXAMPLE 11

1-allyl-3,4-diphenylpyrrolidine methiodide

From the reaction of 1-allyl-3,4-diphenylpyrrolidine and methyl iodide according to previous analogous procedures, the quaternary salt of this example is prepared, M. P. 186–187°.

EXAMPLE 12

1-(2'-hexyl)-3,4-diphenylpyrrolidine

The requisite intermediate, N-(2'-hexyl)-3,4-diphenylsuccinimide is prepared according to the following procedure which is adapted from that described by Long et al., J. Am. Chem. Soc. 73, 5608 (1951):

A mixture of 68 g. of alpha-beta-diphenylsuccinic acid, 65 g. of 2-aminohexane and 70 ml. of water is refluxed for about one hour. The water and excess amine is then removed by distillation at atmospheric pressure and the residue is gradually heated to 250°. After stirring the resultant mixture at this elevated temperature for about 10 minutes, the mixture is cooled slightly and poured into a beaker where it may solidify. Upon recrystallization from ethanol, there is obtained 50 g. of the aforementioned succinimide, M. P., 90–92°.

A mixture of 40.5 g. of the succinimide obtained above and 20 g. of lithium aluminum hydride in ether is treated as described in Example 1 affording, after distillation, 30.5 g. of 1-(2'-hexyl)-3,4-diphenylpyrrolidine, B. P. 174–176°/1 mm.

EXAMPLE 13

*1-isopropyl-3-p-chlorophenyl-4-phenylpyrrolidine*

The requisite intermediate, N-isopropyl-3-p-chlorophenyl-4-phenylsuccinimide, M. P. 97–98°, is prepared in the following manner:

To a refluxing solution of 119 g. of alpha-phenyl-beta-p-chlorophenyl acrylonitrile in about 1900 ml. of methanol and 620 ml. of ether is added a solution of 230 g. of potassium cyanide in 500 ml. of water over a 15 minute period. The resultant mixture is stirred and refluxed for an additional 4–5 hours whereupon a solution of 134 g. of ammonium acetate in 200 ml. of water is added and the whole is stirred for an additional 6 hours. After standing for about 36 hours at room temperature, the excess solvent is removed in vacuo and the residue is extracted thoroughly with chloroform. The chloroform solution is evaporated on a steam bath and the residue so obtained is recrystallized from hexane yielding 103 g. of alpha-phenyl-beta - p - chlorophenylsuccinonitrile, M. P. 229–230°.

The dinitrile so obtained is hydrolyzed to the corresponding succinic acid according to the procedure described by Lapworth and McRae, J. Chem. Soc. 121, 1699 (1922). Thus the hydrolysis of 74 g. of the dinitrile with 90% sulfuric acid according to this procedure affords 79 g. of alpha-phenyl - beta - p - chlorophenylsuccinic acid, M. P. 249–250°, after recrystallization from ethanol.

By reacting the succinic acid with isopropyl amine in a manner analogous to that described in Example 12, the intermediate, 1 - isopropyl-3-p-chlorophenyl - 4 - phenylsuccinimide is obtained.

From the reaction of 32 g. of the succinimide obtained above with 15.2 g. of lithium aluminum hydride according to the procedure described in Example 1, 28 g. of 1-isopropyl-3-p-chlorophenyl-4-phenylpyrrolidine is produced, B. P. 175–178°/1 mm.

EXAMPLE 14

*1 - isopropyl-3-p-chlorophenyl-4-phenylpyrrolidine methyl iodide*

From the reaction of 1-isopropyl-3-p-chlorophenyl-4-phenylpyrrolidine and excess methyl iodide in ether solution as previously described, there is obtained the crystalline quaternary salt of this example, M. P. 201–202°.

EXAMPLE 15

*1-n-propyl-3-phenyl-4-(3',4'-dimethoxyphenyl)-pyrrolidine*

The requisite intermediates are prepared in the following manner:

From the reaction of 175 g. of alpha-phenyl-beta-(3,4-dimethoxyphenyl) - acrylonitrile and the appropriate quantity of potassium cyanide and other reagents described in the analogous procedure in Example 13, there is obtained 180 g. of alpha-phenyl-beta-(3,4-dimethoxyphenyl)-succinonitrile, M. P. 199–200°. Hydrolysis of 228 g. of the dinitrile with sulfuric acid as described in Example 13 affords 190 g. of alpha-phenyl-beta-(3,4-dimethoxyphenyl)-succinic acid, M. P. 239–240°, after recrystallization from 80% aqueous ethanol.

The reaction of the succinic acid so obtained with n-propylamine as described for the analogous intermediate in Example 13 affords the corresponding n-propyl-succinimide, M. P. 87–88°.

The reduction of 20 g. of N-n-propyl-3-phenyl-4-(3',4'-dimethoxy-phenyl)-succinimide with 10 g. of lithium aluminum hydride as described in Example 1 yields 18 g. of 1-n-propyl - 3 - phenyl-4-(3',4'-dimethoxyphenyl)-pyrrolidine, B. P. 190–193°/1 mm.

EXAMPLE 16

*1-n-propyl-3-phenyl-4-(3',4'-dimethoxyphenyl)-pyrrolidine methiodide*

From the reaction of the substituted pyrrolidine obtained in Example 15 with excess methyl iodide according to analogous procedures previously described, there is obtained the above entitled quaternary salt, M. P. 98–102°, after recrystallization from ethanol-ether.

EXAMPLE 17

*1-benzyl-3,4-diphenylpyrrolidine hydrochloride*

The requisite intermediate, N-benzyl-3,4-diphenylsuccinimide, is prepared from 67.5 g. of alpha, beta-diphenylsuccinic acid and 100 g. of benzylamine in the manner described in Example 12. This compound, after recrystallization from ethanol, has a M. P. of 85–87°.

A mixture of 45 g. of the succinimide obtained above and 23 g. of lithium aluminum hydride in ether is treated as described in Example 1 yielding 36 g. of yellow oil, B. P. 208–209°/2 mm.

By saturating an ethereal solution of this compound with anhydrous hydrogen chloride and recrystallization of the salt so obtained from absolute ethanol ether, there is obtained the compound of this example, M. P. 230–231°.

EXAMPLE 18

*1-benzyl-3,4-diphenylpyrrolidine methyl bromide*

By saturating an ethereal solution of the free base of Example 17 with anhydrous methyl bromide, the quaternary salt of this example is obtained M. P. 199–200° after recrystallization from ethanol-ether.

EXAMPLE 19

*1-[2-(p-methoxyphenyl) propyl]-3,4-diphenylpyrrolidine hydrochloride*

The succinimide required for this example is prepared by method of Example 12 from 27 g. of alpha, beta-diphenylsuccinic acid and 53 g. of 2-p-methoxyphenyl-1-amino-propane in which there is obtained 36 g., of M. P. 146–147° after recrystallization from ethanol.

From 33 g. of the above succinimide and 12.5 g. of lithium aluminum hydride, there is obtained 22 g. of the pyrrolidine B. P. 234–236°/1.5 mm.

The hydrochloride is prepared by saturating an ethereal solution of the pyrrolidine of this example with anhydrous hydrogen chloride, M. P. 255–256°.

EXAMPLE 20

*1-[2'-(p-methoxyphenyl)-propyl]-3,4-diphenyl-pyrrolidine methyl bromide*

An ether solution of 1-/2-(p-methoxyphenyl) propyl-3,4-diphenylpyrrolidine is converted into the quaternary salt of this example by the method of Example 3.

EXAMPLE 21

*1-isopropyl-3(o-methoxyphenyl)-4-phenyl-pyrrolidine hydrochloride*

The requisite succinimide is obtained from 59.8 g. of alpha (o-methoxy-phenyl)-beta-phenylsuccinic acid and 17.7 g. of isopropyl amine by the method of Example 12.

Thirty eight grams of the above succinimide was reduced with 15.2 g. of lithium aluminum hydride, yielding 22 g. of the free base of this example as an oil, B. P. 170–171°/1.5 mm.

The above pyrrolidine was converted into the hydrochloric acid salt by the method previously described.

EXAMPLE 22

*1-isopropyl-3(o-methoxyphenyl)-4-phenyl-pyrrolidine methyl bromide*

By the method of Example 3, the compound of this example is prepared from 1-isopropyl-3(o-methoxyphenyl)-4-phenylpyrrolidine and recrystallized from ethanol-ether.

EXAMPLE 23

*1-isopropyl-3(3',4'-dimethoxyphenyl)-4-phenylpyrrolidine*

The condensation of alpha-phenyl-beta(3,4-dimethoxyphenyl)succinic acid and isopropylamine by the method of Example 15 affords the requisite intermediate succinimide. Lithium aluminum hydride reduction of 20 g. of the succinimide of this example yields 15 g. of 1-isopropyl-3(3',4'-dimethoxyphenyl)-4-phenylpyrrolidine, B. P. 185–190°/3 mm.

EXAMPLE 24

*1-isopropyl-3(3',4'-dimethoxyphenyl)-4-phenylpyrrolidine dimethyl sulfate*

To 10 g. of the pyrrolidine of Example 23 dissolved in 50 ml. of anhydrous benzene, is added an excess of anhydrous dimethylsulfate. The mixture is heated for three hours on a steam bath, cooled and diluted with four volumes of anhydrous ether. The quaternary salt of this example is obtained as a white crystalline substance after recrystallization from methanol.

EXAMPLE 25

*1-isopropyl-3(3',4'-dihydroxyphenyl)-4-phenylpyrrolidine hydrochloride*

To a stirred solution of 5 g. of 1-isopropyl-3(3',4'-dimethoxyphenyl)-4-phenylpyrrolidine of Example 23 in 250 ml. of anhydrous benzene is added 50 g. of anhydrous aluminum chloride in several small portions. After one-half hour in an ice bath, the mixture is gradually heated and is refluxed for an additional four hours. The excess aluminum chloride is decomposed with water, and the benzene layer is separated and concentrated in vacuo on the steam bath. The residue is recrystallized from 80% ethanol yielding the hydrochloride of this example.

EXAMPLE 26

*1-isopropyl-3(3',4'-dihydroxyphenyl)-4-(4'-methoxyphenyl) pyrrolidine maleate*

To a concentrated alcoholic solution of 318 g. of 3,4-dibenzyloxy-benzaldehyde and 147 g. of p-methoxyphenyl-acetonitrile, is added a solution containing 10 g. of sodium dissolved in 150 ml. of anhydrous ethanol. The corresponding unsaturated nitrile soon precipitates and is removed by filtration. This intermediate is converted into dicyano compound by procedure of Example 13. The dinitrile so obtained is hydrolyzed to the corresponding succinic acid by the procedure of Example 13.

By reacting alpha - (3,4 - dibenzyloxyphenyl)-beta-p-methoxyphenyl-succinic acid with isopropylamine in a manner similar to that of Example 12, the corresponding isopropylsuccinimide is obtained.

The reduction of 53.5 g. of the succinimide with 12.8 g. of lithium aluminum hydride yields 38 g. of the corresponding pyrrolidine. A solution of the latter in 250 ml. absolute ethanol is debenzylated with hydrogen and 20 g. of a 5% palladium-on-charcoal catalyst. After the theoretical uptake of hydrogen the catalyst is removed by filtration and the alcohol is removed in vacuo. The residue is dissolved in anhydrous isopropyl acetate and treated with a solution of maleic acid in ethyl acetate. Upon cooling and scratching the maleate salt of this example crystallizes and after filtration is recrystallized from a mixture of isopropyl acetate and anhydrous ether.

EXAMPLE 27

*1-isopropyl-3(3',4'-dihydroxyphenyl)-4-(4'-methoxyphenyl)pyrrolidine ethyl bromide*

The free pyrrolidine compound of Example 24 is dissolved in ether and converted into the compound of this example by adding the theoretical amount of ethyl bromide. After cooling overnight in the refrigerator, the quaternary salt is filtered off and recrystallized from absolute ethanol.

EXAMPLE 28

*1-isopropyl-3(o-bromphenyl)-4-phenylpyrrolidine acid tartrate*

Alpha-phenyl-beta(o-bromphenyl)-acrylonitrile is converted into alpha-phenyl-beta (o-bromphenyl)-succinonitrile by the method of Example 13. The resulting dinitrile is hydrolyzed with concentrated sulfuric acid to alpha-phenyl-beta (o-bromophenyl) succinic acid as in Example 13. By reacting the succinic acid with isopropylamine in a manner analogous to that of Example 12, the corresponding succinimide is obtained.

Reduction of 25 g. of 1-isopropyl-3(o-bromphenyl)-4-phenyl succinimide with lithium aluminum hydride yields the pyrrolidine free base of this example, B. P. 185–189°/1 mm.

The tartrate salt of this example is formed by dissolving the free pyrrolidine in ether and adding one equivalent of tartaric acid. The tartrate salt precipitates immediately and after filtration is recrystallized from absolute methanol.

EXAMPLE 29

*1-isopropyl-3(o-bromphenyl)-4-phenylpyrrolidine isopropyl iodide*

A solution of 10 g. of 1-isopropyl-3(o-bromphenyl)-4-phenylpyrrolidine in 150 cc. of absolute isopropanol is treated with 10 g. of isopropyl iodide and the mixture is refluxed for three hours. The reaction mixture is cooled and diluted with three volumes of anhydrous ether whereupon the compound of this example precipitates in the form of a yellow gummy mass. Upon solution in hot absolute methanol, followed by clarification with carbon the white crystalline quaternary salt of this example is obtained upon cooling.

EXAMPLE 30

*1-isopropyl-3(3',4'-dihydroxyphenyl)-4-(3',4'-dimethoxyphenyl) pyrrolidine hydrobromide*

The compound of this example is prepared by the method described in Example 26 from 3,4-dibenzyloxy-benzaldehyde and 3,4-dimethoxyphenyl-acetonitrile. The intermediary acid, alpha-(3,4-dibenzyloxyphenyl)-beta-(3,4-dimethoxyphenyl)-succinic acid is heated with isopropylamine to give the desired N-isopropyl-3(3',4'-dibenzyloxyphenyl) - 4 - (3',4' - dimethoxyphenyl) - succinimide which is recrystallized from 80% ethanol. Lithium aluminum hydride reduction and catalytic debenzylation of this intermediate is carried out as in Example 26 to give 1-isopropyl-3(3',4'-dihydroxyphenyl)-4-(3',4'-dimethoxyphenyl)-pyrrolidine which is isolated as the hydrobromide salt.

EXAMPLE 31

*1-isopropyl-3(p-chlorphenyl)-4-(3',4'-dimethoxyphenyl)-pyrrolidine maleate*

A mixture of 1.5 moles of veratric aldehyde, 1.5 moles of p-chlorphenylacetonitrile and 15 cc. of 50% potassium hydroxide is heated on a steam bath for four hours and the resulting product is recrystallized from alcohol.

Two hundred and ninety-nine grams of alpha-p-chlorphenyl - beta - (3,4 - dimethoxyphenyl) - acrylonitrile (obtained in the preceding paragraph) is converted into alpha-(p-chlorphenyl)-beta-(3,4-dimethoxyphenyl)-succinonitrile by the method of Example 13.

A solution of 78.2 g. of alpha (p-chlorphenyl)-beta-(3,4-dimethoxyphenyl)-succinonitrile in 500 ml. of methanol and 25 g. of KOH dissolved in 100 g. of water is heated in an autoclave at 160–170° for six hours. After cooling, the alcohol is removed by distillation and the residue is acidified with concentrated hydrochloric acid, whereby the alpha (p-chlorophenyl)-beta-3,4-dimethoxyphenyl)-succinic acid is precipitated, the succinic acid is converted into the corresponding N-isopropylsuccinimide by the mehod of Example 12.

The 1-isopropyl-3-(p-chlorphenyl)-4-(3',4'-dimethoxyphenyl)-succinimide so obtained, is reduced with lithium aluminum hydride by the method of Example 1, B. P. 188–192°/1 mm.

Fifteen grams of the above-mentioned pyrrolidine is dissolved in ethyl acetate and treated with the theoretical amount of maleic acid dissolved in ethyl acetate. The mixture is heated to reflux for one hour and after cooling, crystals of the maleate salt of this example crystallizes.

EXAMPLE 32

*1-isopropyl-3(p-chlorphenyl)-4-(3',4'-dimethoxyphenyl)-pyrrolidinemethiodide*

Ten grams of 1-isopropyl-3-(p-chlorphenyl)-4-(3',4'-dimethoxyphenyl)-pyrrolidine is dissolved in 100 ml. anhydrous ether and 10 g. of methyl iodide is added. The mixture is kept at 0–5° for 24 hours and the compound of this example is filtered off and is recrystallized from a mixture of methanol ether.

EXAMPLE 33

*1-isopropyl-3(p-chlorphenyl)-4-(3',4'-dimethoxyphenyl) pyrrolidine diethylsulfate*

To 10 g. of the pyrrolidine of Example 31 dissolved in 500 ml. of anhydrous benzene, is added 10 g. of diethylsulfate and the mixture is heated for three hours under reflux on the steam bath. The benzene is removed by vacuum concentration and the residue is triturated several times with dry ether. The product after recrystallization from methanol-ether is obtained as white crystals.

EXAMPLE 34

*1-propyl-3(o-methoxyphenyl)-4-(o-methoxyphenyl pyrrolidine hydrochloride*

One hundred and thirty-six grams of o-methoxybenzaldehyde and 147 g. of o-methoxybenzylcyanide are condensed with sodium ethylate to give alpha-(o-methoxyphenyl) - beta - (o - methoxyphenyl) - acrylonitrile. The latter on treatment with potassium cyanide in the manner previously described is converted into alpha-(o-methoxyphenyl) - beta - (o - methoxyphenyl) - succinonitrile.

The dinitrile is hydrolyzed to the corresponding succinic acid by the method described in Example 31.

Fifty-four grams of alpha-o-methoxyphenyl-beta-o-methoxyphenyl-succinic acid is converted to the N-propylsuccinimide by the method of Example 12.

1 - propyl - alpha (o - methoxyphenyl) - beta - (o-methoxyphenyl)-succinimide is reduced with lithium aluminum hydride in ether to give the pyrrolidine of this example as a colorless oil having a B. P. of 179–183°/1 mm.

The hydrochloride is prepared in the manner described in Example 5 and is recrystallized from ethanol-ether.

EXAMPLE 35

*1-propyl-3(o-methoxyphenyl)-4-(o-methoxyphenyl)-pyrrolidine ethyl bromide*

A mixture of 10 g. of 1-propyl-3(o-methoxyphenyl)-4-(o-methoxyphenyl)-pyrrolidine and 10 g. of ethyl bromide in 50 cc. of absolute ether is heated on the steam bath for four hours and allowed to cool overnight at 0–5°. The compound of this example is filtered off and recrystallized from a mixture of alcohol-ether.

EXAMPLE 36

*1-(2-hexyl)-3-(m-methylphenyl)-4-phenyl-pyrrolidine*

Beta - (m - methylphenyl) - alpha - phenyl - acrylonitrile is prepared in the usual manner from 1 mole equivalent each of m-methylbenzaldehyde and phenylacetonitrile.

From 109 g. of beta (m-methylphenyl)-alpha-phenyl-acrylonitrile and 130 g. of potassium cyanide there is obtained 78 g. of alpha-phenyl-beta-(m-methylphenyl)-succinonitrile.

This dinitrile is hydrolyzed by method in Example 12 to yield alpha-phenyl-beta-(m-methylphenyl)-succinic acid.

Twenty-eight grams of the succinic acid of this example and 30.3 g. of 2-aminohexane are condensed in the manner analogous to that described and after pyrolysis, 1(2'-hexyl)-3-(m-methylphenyl)-4-phenylsuccinimide is obtained and recrystallized from ethanol.

The resulting succinimide is reduced with lithium aluminum hydride to give the compound of this example, B. P. 168–170°/2 mm.

EXAMPLE 37

*1-(2-hexyl)-3-(m-methylphenyl)-4-phenylpyrrolidine salicylate*

To 10 g. of 1-(2-hexyl)-3-(m-methylphenyl)-4-phenyl-pyrrolidine dissolved in 100 ml. of anhydrous ether is added a solution of 6.9 g. of salicylic acid dissolved in 50 ml. of ether. After refluxing for 10 minutes on a steam bath, the mixture is cooled and the compound of this example precipitates as a white crystalline mass.

EXAMPLE 38

*1-(2-hexyl)-3-(m-methylphenyl)-4-phenylpyrrolidine methyl bromide*

The quaternary salt of the example is prepared from 1 - (2 - hexyl) - 3 - (m - methylphenyl) - 4 - phenyl-pyrrolidine and methyl bromide by the method of Example 3.

EXAMPLE 39

*2-methyl-3,4-diphenylpyrrolidine*

A solution of 12 g. of 1,2-diphenyl-1-acetyl-2-cyanoethane (Goldsmiedt and Knopfer, J. Chem. Soc. Abstracts (1902 p. 40–41) in 700 ml. of absolute ethanol is reduced in an autoclave at 750 lbs. initial hydrogen pressure at 70–80° C. in the presence of 10 g. of Raney Nickel catalyst. After seven hours the catalyst is removed and the filtrate is concentrated and the residue is distilled yielding 2-methyl-3,4-diphenylpyrrolidine, B. P. 172–176°/6 mm.

EXAMPLE 40

*2-methyl-3,4-diphenylpyrrolidine hydrochloride*

An ether solution of 2-methyl-3,4-diphenylpyrrolidine is saturated with anhydrous hydrogen chloride by the method of Example 2. After recrystallization at 197–198°, the hydrochloride melts at 197–198°.

EXAMPLE 41

*1-isopropyl-2-methyl-3,4-diphenylpyrrolidine*

A mixture of 10 g. of 2-methyl-3,4-diphenylpyrrolidine and 20 g. of acetone is treated with 5 g. of Raney Nickel catalyst and the reaction is carried at 150° C. and 1500 lbs. of hydrogen pressure, the catalyst is removed by filtration, solvent concentrated in vacuo and the residue distilled yielding the pyrrolidine of this example, B. P. 169–172°/1 mm.

Alternatively, one mole equivalent of 2-methyl-3,4-diphenylpyrrolidine and one mole of isopropyl iodide is stirred and heated with two moles of anhydrous potassium carbonate in a large volume of anhydrous xylene for 20 hours under reflux. After cooling, the inorganic salts are filtered off and the xylene solution is concentrated and the residual oil is distilled, B. P. 180–185°/2 mm.

EXAMPLE 42

*1-isopropyl-3,4-diphenyl-2-methyl-4-hydroxypyrrolidine acid succinate*

A mixture of 249 g. of ethyl 3-isopropylamino-2-phenyl-butyrate, 167 g. of ethyl bromoacetate and 276 g. of anhydrous potassium carbonate in two liters of anhydrous toluene is heated under reflux with stirring for 20 hours. The inorganic salts are filtered off and the toluene filtrate is concentrated and distilled. The product diethyl beta-phenyl-beta-2'-isopentyl-succinate is a colorless oil having a boiling point of 160–165°/3 mm.

One hundred and seventy grams of the above diester is added dropwise to a solution of 13 g. of powdered sodium in 40 g. of ethanol and 500 ml. of anhydrous toluene. The mixture is heated under reflux with stirring for six hours and is allowed to cool overnight at room temperature. Five hundred milliliters of ice water is added and the organic layer is separated and discarded. The aqueous layer is acidified to Congo Red with concentrated hydrochloric acid and an additional 200 ml. of hydrochloric acid is added. The mixture is heated on the steam bath for six hours and is concentrated to one-half its volume in vacuo bath. The residue is made strongly basic with 50% sodium hydroxide, saturated with potassium carbonate and is exhaustively extracted with ether. The ether extracts are dried over anhydrous sodium sulfate and are distilled yielding 1-isopropyl-2-methyl-3-phenylpyrrolidone-4, B. P. 110–112°/1 mm.

To the Grignard reagent prepared in the usual manner from 14.5 g. of magnesium and 94 g. of bromobenzene in ether is added 66 g. of 1-isopropyl-2-methyl-3-phenylpyrrolidone-4 dissolved in 100 ml. of anhydrous ether. The mixture is refluxed with stirring for four hours and is decomposed by the careful addition of a 10% ammonium chloride solution. The organic material is extracted with ether and ether extracts are concentrated and the residue is distilled, B. P. 176–180°/1 mm. The product 1-isopropyl-3,4-diphenyl-2-methyl-4-hydroxy-pyrrolidine crystallizes on standing.

The above free base is dissolved in ether and an equivalent amount of succinic acid dissolved in ether is added. After refluxing for one-half hour the acid salt of this example crystallizes on cooling.

EXAMPLE 43

*1-isopropyl-3,4-diphenyl-2-methyl-4-hydroxypyrrolidine methyl iodide*

To 10 g. of 1-isopropyl-3,4-diphenyl-2-methyl-4-hydroxy pyrrolidine dissolved in absolute ether is added 10 g. of methyl iodide by the procedure of Example 6. The quaternary salt of this example crystallizes from the reaction mass and is recrystallized from alcohol-ether.

We claim:

1. Compounds of the group consisting of the free bases of the following formula and the therapeutically acceptable acid addition and quaternary salts thereof:

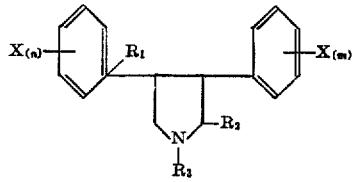

wherein $R_1$ is a member of the group consisting of H and OH, $R_2$ is a member of the group consisting of H, and lower alkyl, $R_3$ is a member of the group consisting of lower alkyl, lower alkenyl and benzyl, X is a member of the group consisting of H, halogen, OH, lower alkyl and lower alkoxy, and $m$ and $n$ are whole numbers less than 3.

2. 1-isopropyl-3,4-diphenylpyrrolidine methobromide.
3. 1-allyl-3,4-diphenylpyrrolidine methiodide.
4. 1-isopropyl-3(o-methoxyphenyl)-4 - phenylpyrrolidine methyl bromide.
5. 1 - isopropyl-3(3',4'-dihydroxyphenyl)-4-phenylpyrrolidine hydrochloride.
6. 1-isopropyl-3,4-diphenyl-2-methyl - 4 - hydroxypyrrolidine acid succinate.
7. Therapeutically acceptable quaternary salts of N-lower alkyl-3,4-diphenylpyrrolidines.
8. Therapeutically acceptable quaternary salts of N-lower alkyl-3(o-lower alkoxyphenyl)-4-phenylpyrrolidines.
9. Therapeutically acceptable acid addition salts of N-lower alkyl-3(3',4' - dihydroxyphenyl)-4-phenylpyrrolidines.
10. Therapeutically acceptable acid addition salts of N-lower alkyl-2-lower alkyl-3,4-diphenylpyrrolidines.
11. In the process for preparing compounds of the group consisting of the free bases of the following formula and their therapeutically acceptable acid addition and quaternary salts:

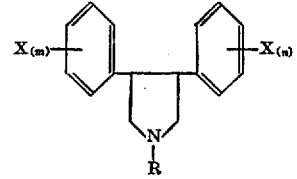

wherein X is a member of the group consisting of H, halogen, OH, lower alkyl and lower alkoxy, R is a member of the group consisting of lower alkyl, lower alkenyl and benzyl, and $m$ and $n$ are whole numbers less than 3, the step which comprises reducing a succinimide of the formula:

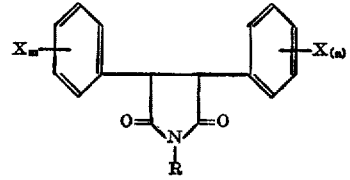

with lithium aluminum hydride and isolating the pyrrolidine thereby formed.

12. The process according to claim 11 including the step of reacting the pyrrolidine with a quaternizing agent which forms a therapeutically acceptable quaternary salt and isolating the quaternary salt thereby formed.

13. In the process for preparing N-lower alkyl-3,4-diphenylpyrrolidine, the step which comprises reducing an N-lower alkyl-diphenylsuccinimide with lithium aluminum hydride and isolating the N-lower alkyl-3,4-diphenylpyrrolidine so formed.

14. The process of claim 13 wherein the starting material is N-isopropyl-3,4-diphenylsuccinimide and N-isopropyl-3,4-diphenylpyrrolidine is formed.

15. The process of claim 13 including the step of quaternizing the pyrrolidine so as to form a therapeutically acceptable quaternary salt.

References Cited in the file of this patent

J. A. C. S., vol. 58, page 2489 (1936).

Spath: Monatschefte fur Chemie und Verwandte Teile Anderer Weissensehaften, vol. 50, pages 349–56 (1928).

Chen et al.: Jour. Pharm. and Expt. Therap., vol. 103, pages 54–61 (1951).

Moffet et al.: J. Org. Chem., vol. 17 (No. 3), pages 407–13.

UNITED STATES PATENT OFFICE

Certificate of Correction

Patent No. 2,852,526

September 16, 1958

Frank John Villani et al.

It is hereby certified that error appears in the printed specification of the above numbered patent requiring correction and that the said Letters Patent should read as corrected below.

Column 13, lines 64 to 70, the generic formula should appear as shown below instead of as in the patent—

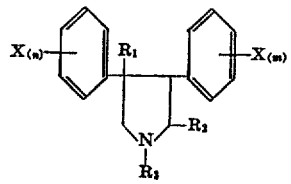

Signed and sealed this 18th day of November 1958.

[SEAL]

Attest:
KARL H. AXLINE,
*Attesting Officer.*

ROBERT C. WATSON,
*Commissioner of Patents.*